United States Patent [19]

Fukada et al.

[11] Patent Number: 5,385,527
[45] Date of Patent: Jan. 31, 1995

[54] METHOD FOR THE PREPARATION OF CYLINDRICAL MEMBERS FOR PAPER CONTAINERS

[75] Inventors: Toru Fukada, Ichihara; Shigeichi Ishihara, Kawasaki, both of Japan

[73] Assignee: Du Pont-Mitsui Polychemicals Co., Ltd., Tokyo, Japan

[21] Appl. No.: 149,694

[22] PCT Filed: Jul. 23, 1991

[86] PCT No.: PCT/JP91/00980
§ 371 Date: Mar. 6, 1992
§ 102(e) Date: Mar. 6, 1992

[87] PCT Pub. No.: WO92/01559
PCT Pub. Date: Feb. 6, 1992

Related U.S. Application Data

[63] Continuation of Ser. No. 838,200, Mar. 6, 1992, abandoned.

[30] Foreign Application Priority Data

Jul. 26, 1990 [JP] Japan .................. 2-198277

[51] Int. Cl.⁶ .................. B31B 1/14; B31B 1/64; B31C 1/00
[52] U.S. Cl. .................. 493/135; 493/287; 493/394; 156/272.8
[58] Field of Search .......... 493/135, 287, 394; 156/272.8

[56] References Cited

U.S. PATENT DOCUMENTS

| | | | |
|---|---|---|---|
| 3,495,507 | 2/1970 | Haas et al. | 493/287 |
| 3,604,317 | 9/1971 | Baun | 493/287 |
| 3,654,842 | 4/1972 | Schwenk | 493/287 |
| 3,716,435 | 2/1973 | Jensen et al. | 493/287 |
| 3,997,385 | 12/1976 | Osborne | 156/272.8 |
| 4,490,203 | 12/1984 | Bose | 156/251 |
| 4,540,392 | 9/1985 | Junod et al. | 493/135 |
| 4,698,246 | 10/1987 | Gibbons et al. | 428/35 |
| 4,708,708 | 11/1987 | Fries et al. | 493/60 |
| 4,753,832 | 6/1988 | Brown et al. | 428/35 |
| 4,898,477 | 2/1990 | Cox et al. | 426/115 |

FOREIGN PATENT DOCUMENTS

| | | |
|---|---|---|
| 0237192 | 9/1987 | European Pat. Off. . |
| 0398447 | 11/1990 | European Pat. Off. . |
| 1256527 | 12/1967 | Germany . |
| 3023835 | 1/1981 | Germany . |
| 8910231 | 11/1989 | WIPO . |

OTHER PUBLICATIONS

Research Disclosure, Sep. 1981, HAVANT GB, pp. 358–359 RD20941 'laser bonding of plastic parts (D. R. Schmith)'.

Primary Examiner—William E. Terrell
Attorney, Agent, or Firm—Varndell Legal Group

[57] ABSTRACT

The present invention is directed to a method for preparing cylindrical members for paper containers having a thermoplastic resin layer as the innermost layer by cylindrically forming a preform sheet made up of a laminate comprising at least a paper layer and the thermoplastic resin layer, the laminate is arranged so that the thermoplastic layer becomes the innermost layer of the paper containers and is selected from the group consisting of polyesters and ethylene/vinyl alcohol copolymers. The method includes the steps of folding the innermost layer along one edge of the preform sheet back over itself, irradiating the folded edge and another edge of the preform sheet both of which are made of the thermoplastic resin layer of polyesters or ethylene/vinyl alcohol copolymers using a carbon dioxide gas laser irradiation, thereby softening or melting the thermoplastic resin layer, overlapping the irradiated edges, and pressing the overlapped portion to seal the thermoplastic resin layers together.

8 Claims, 4 Drawing Sheets

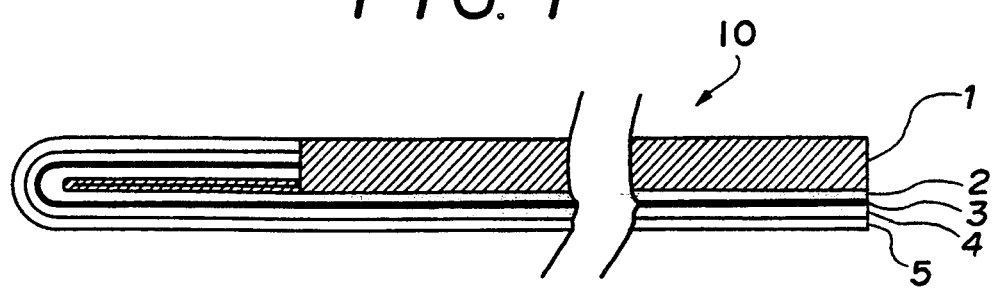
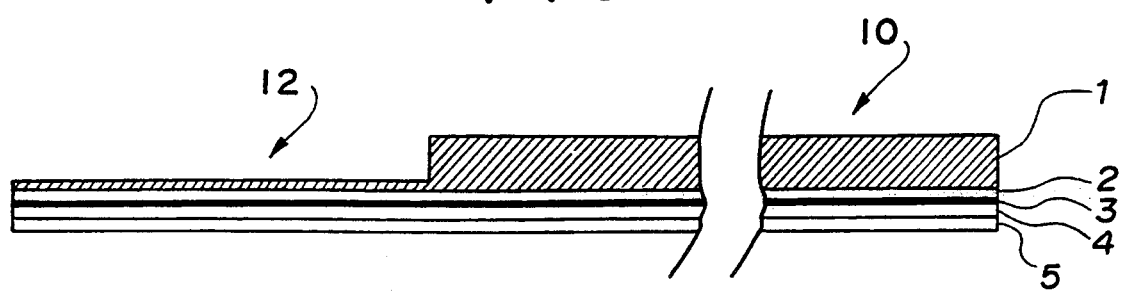

METHOD FOR THE PREPARATION OF CYLINDRICAL MEMBERS FOR PAPER CONTAINERS

CROSS-REFERENCES TO RELATED APPLICATIONS

This application is a continuation of Ser. No. 07/838,200, filed Mar. 6, 1992, abandoned.

FIELD OF THE INVENTION

The present invention relates to a method for the preparation of cylindrical members for paper containers excellent in gas barrier properties and flavor barrier properties, and more in detail to a method for the high speed preparation of cylindrical members having an excellent sealing surface from preform sheets for paper containers.

BACKGROUND OF THE INVENTION

Multilayered paper containers have been widely used as containers for a variety of fruit drinks and lactic acid bacteria beverages. Since the paper containers are made by heat sealing a preform sheet comprising a paper and a heat-sealing resin layer provided on the inner surface of the paper. For the purpose of increasing gas barrier properties and light-shielding properties thereof, the preform sheet for containers has in some cases a multilayered structure having an aluminum foil inner layer and a heat-sealing resin inner layer on the aluminum foil layer. Olefin polymers such as polyethylene have heretofore been used mainly as the heat-sealing resin as mentioned above. The olefin polymers have such excellent properties as good flexibility as well as good heat-sealing properties, and, therefore, pinholes are not formed when folded. The preparation of such paper containers include as a first step a step of preparing cylindrical members from a laminate (the preform sheet) comprising a paper layer and a heat sealing layer. The so-called flame sealing method has often been employed in the step from the standpoint of heat sealing properties and productivity thereof, wherein the resin of the heat sealing layer is melted by a gas flame, etc., and the layers are quickly pressed each other.

Such a heat-sealed layer will directly contact with the contents such as drinks and beverages. The olefin polymer used as the heat-sealed layer tends to absorb flavor or fragrance of the contents, and, as a result, the containers have a drawback that certain types of packaged materials change their taste and flavor.

The use of polyesters or ethylene/vinyl alcohol copolymers as the inner layer resin is considered to be useful for the improvement of such a drawback. When a laminate including such an inner resin layer is wrap-sealed, the seal is usually formed between an olefin polymer such as polyethylene with which the outer layer of the paper is usually coated, and a polyester or an ethylene/vinyl alcohol copolymer as the inner layer. Flame sealing usually gives sufficient seal strength to the sealed paper containers. When an olefin polymer, and a polyester or an ethylene/vinyl alcohol copolymer are heat sealed by the wrap sealing, however, flavor leakage from the sealed portion becomes unavoidable. As a result, the use of such paper containers for drinks and beverages includes problems.

For the purpose of solving such problems, it seems effective to adopt the so-called hemming method or skive-hemming method for the preparation of cylindrical members wherein an edge along one side of a preform sheet (a laminate) for paper containers is folded back, the folded edge is put upon the other edge, and both inner layer resins are heat sealed together. It is, however, found that those cylindrical members prepared by the above-mentioned methods wherein the inner layer resins are sealed together by the flame sealing have such a serious disadvantage that seals excellent in seal strength cannot be obtained although the seal is formed between the same kind of materials.

In view of the present situation as described above, the present inventors have carried out researches for a preparation process of cylindrical members for paper containers excellent in gas barrier properties and flavor barrier properties. As a result, it has been found that the cylindrical members having desired properties such as sealing properties excellent in seal strength can be manufactured with high productivity by using a specific type of the inner layer resin and a seal structure, and using a specific type of laser beam.

DISCLOSURE OF THE INVENTION

The present invention relates to a method for the preparation of a cylindrical member for a paper container having a thermoplastic resin layer as their innermost layer by forming into a cylindrical form a preform sheet composed of a laminate comprising at least a paper layer and the thermoplastic resin layer which thermoplastic resin is to become the innermost layer of the paper container and is selected from the group consisting of polyesters and ethylene/vinyl alcohol copolymers, wherein said method comprises the steps of folding back an edge along one side of the preform sheet, putting the thermoplastic resin layer of the folded edge on that of the other edge, softening or melting both thermoplastic resin layers using carbon dioxide gas laser irradiation, and pressing the overlapped portion to seal the thermoplastic resin layers.

It is preferable in the present invention that the sealing portion is irradiated with a carbon dioxide gas laser beam having uniform intensity in the direction vertical to the sealing portion.

BRIEF DESCRIPTION OF THE DRAWINGS

FIG. 1 is a sectional view of a preform sheet having a folded edge along one side thereof for manufacturing paper containers of the invention.

FIG. 2 is a sectional view of a laminate, from which a portion of paper has been skived, for manufacturing a preform sheet.

Figure 3A:
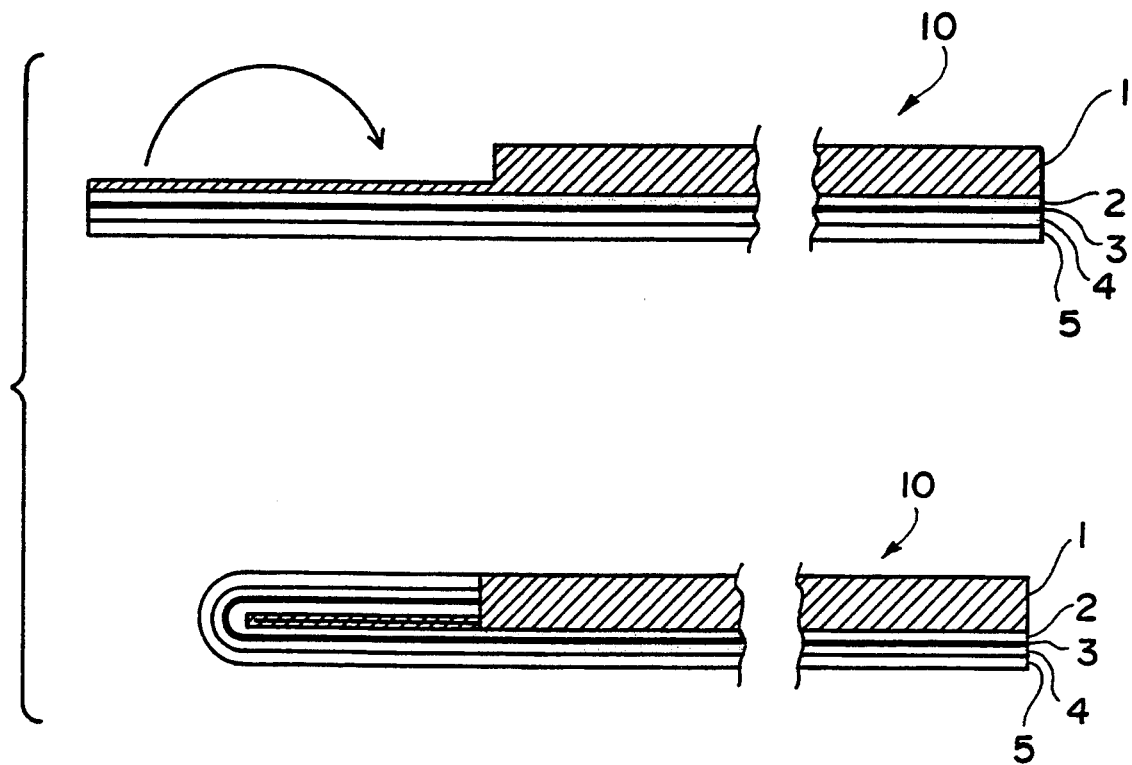
FIGS. 3A, 3B, and 3C are schematic views showing a first embodiment of carrying out the method of the present invention.

The numerals and symbol in these figures are designated as follows: 1 is a paper layer, 2 is a polyethylene layer, 3 is a aluminum layer, 4 is a modified polyethylene layer, 5 is a polyester layer, L is a laser beam, P is pressure, and S is a sealing portion.

BEST MODES FOR CARRYING OUT THE INVENTION

The method for the preparation of a cylindrical member for a paper container according to the present invention is concretely illustrated hereinafter.

The preform sheet for a paper container used in the invention may have a layer of another thermoplastic resin, a metallic foil layer and an adhesive layer, so long as they comprise a paper layer and a thermoplastic resin layer selected from the group consisting of polyesters and ethylene/vinyl alcohol copolymers. Examples of such a laminate preform sheet include a paper/(T) sheet (wherein (T) denoting a layer of a thermoplastic resin selected from the group consisting of polyesters and ethylene/vinyl alcohol copolymers), a paper/ethylene polymer/(T) sheet, a paper/ethylene polymer/aluminum/ethylene polymer/(T) sheet and a paper/ethylene polymer/aluminum/(T) sheet. These paper sheets may of course have an ethylene polymer layer, etc., on the paper as an outer layer.

The polyesters used in the invention are preferably polyethylene terephthalate comprising terephthalic acid units and ethylene glycol units as its main polymeric components, and those polyester copolymers further comprising 3 to 20 mol %, preferably 5 to 15 mol % of copolymeric components in addition to the above-mentioned main polymeric components are especially preferable in view of the heat sealing properties. Examples of such copolymeric components include units of aromatic dicarboxylic acid derived from isophthalic acid, phthalic acid, 2,6-naphthalenedicarboxylic acid and p-oxybenzoic acid, units of aliphatic or alicyclic dicarboxylic acid derived from adipic acid, sebacic acid and cyclohexanedicarboxylic acid, and units of diol derived from propylene glycol, 1,4-butanediol, 1,4-cyclohexanedimethanol, diethylene glycol and triethylene glycol. Of these copolymeric components, particularly preferred are units derived from isophthalic acid, 1,4-cyclohexanedimethanol and diethylene glycol, etc. Those polyesters having an intrinsic viscosity of 0.50 to 1.4 dl/g, particularly 0.7 to 1.0 dl/g are preferable.

The ethylene/vinyl alcohol copolymers usable in the invention comprise vinyl alcohol units in an amount of 40 to 85 mol %, most suitably 50 to 70 mol %. The ethylene/vinyl alcohol copolymers may further contain units of other than ethylene units and vinyl alcohol units if the amount is not greater than 10 mol %. Such copolymers can be prepared by saponifying ethylene/vinyl acetate copolymers containing preferably about 40 to 95 mol % of vinyl acetate units to a saponification degree of 90 to 100%.

Such a thermoplastic resin layer may be incorporated with other thermoplastic resins and additives for the purpose of improving heat sealing properties and other properties thereof. Examples of such incorporated materials include various ethylene polymers and antioxidants. Examples of such ethylene polymers include low-density polyethylene, ethylene/α-olefin copolymers, ethylene/vinyl acetate copolymers, ethylene/unsaturated carboxylic acid copolymers or metal salts thereof, ethylene/unsaturated carboxylic acid ester copolymers, ethylene/unsaturated carboxylic acid/unsaturated carboxylic acid ester copolymers and graft-modified copolymer as mentioned above with an unsaturated carboxylic acid or its anhydride.

Though the thickness of each layer in the laminate is not limited, the thickness of the paper layer is preferably about 100 to 1000 μm, and that of the sealing layer is preferably about 5 to 200 μm if the strength, the barrier properties, the seal strength, etc. of the container are considered.

The cylindrical member is prepared by the so-called hemming method wherein an edge along one side of a preform sheet is folded back, and the thermoplastic resin layer of the folded edge are put upon that of the other edge, and the resin layers which are to form the inner layer of the paper containers are melt bonded, or by skive-hemming method wherein the paper layer portion which is to become the inner side at the time of folding back is thinned by skiving, and the thinned portion is folded back.

FIG. 1 shows a sectional view of a preform sheet prepared by skive-hemming method from a laminate consisting of five layers, namely, paper/PE/Al/modified PE/polyester layers. The preform sheet 10 as shown in FIG. 1 can be prepared from a laminated sheet consisting of five layers, namely, paper(1)/PE(2)/Al(3)/modified PE(4)/polyester(5) as shown in FIG. 2 by skiving a portion of the paper layer 1 so that it becomes a thin portion 12, and folding back the skived portion over itself about its midpoint so as to have the structure shown in FIG. 1. This is shown schematically in FIG. 3A. Excellent flavor barrier properties of the paper containers can be maintained by adopting such sealing methods as mentioned above. The cylindrical member may have various cross sectional forms such as square, rectangular, oval and circular forms.

Figure 3B:
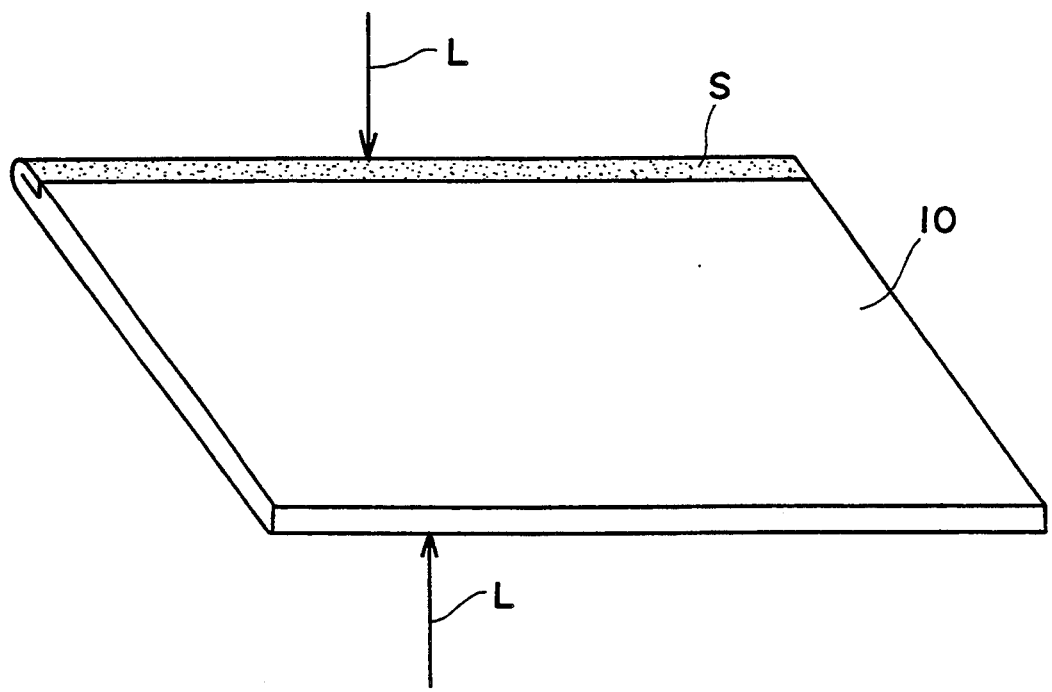

The sealing is carried out by irradiating the resin layer to be sealed with a carbon dioxide gas laser having a wavelength of about 10.6 μm to soften or melt the resin, facing the irradiated surfaces and pressing the overlapped surfaces. As shown in FIG. 3B, both the edges of the preform sheet which has been subjected to skive-hemming treatment are irradiated with a carbon dioxide gas laser beam.

Figure 3C:
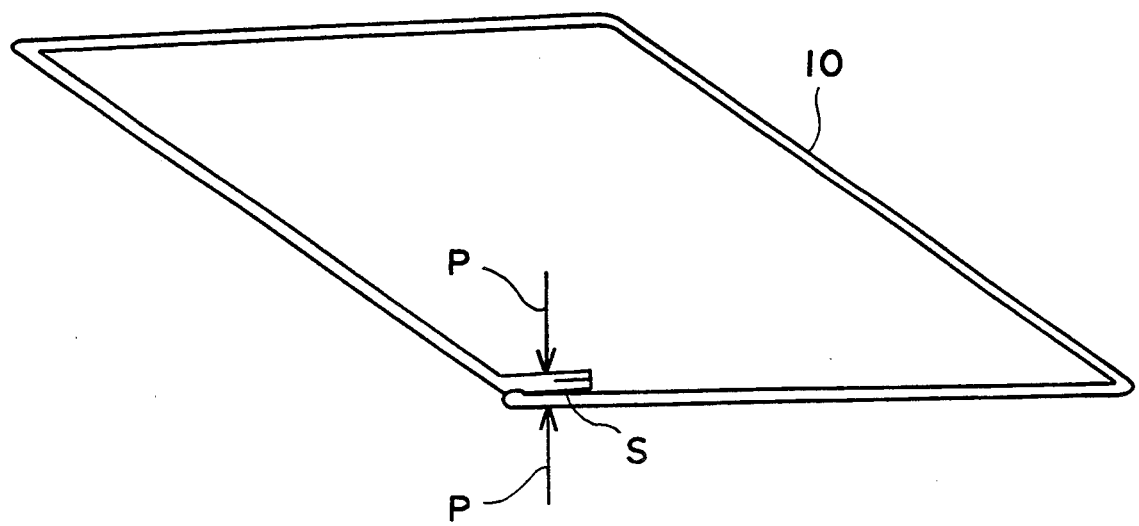

As shown in FIG. 3C the irradiated preform sheet of FIG. 3B is formed into a cylindrical shape so that the seal portions are overlapped, and the overlapped portions are pressed together.

Figure 4:
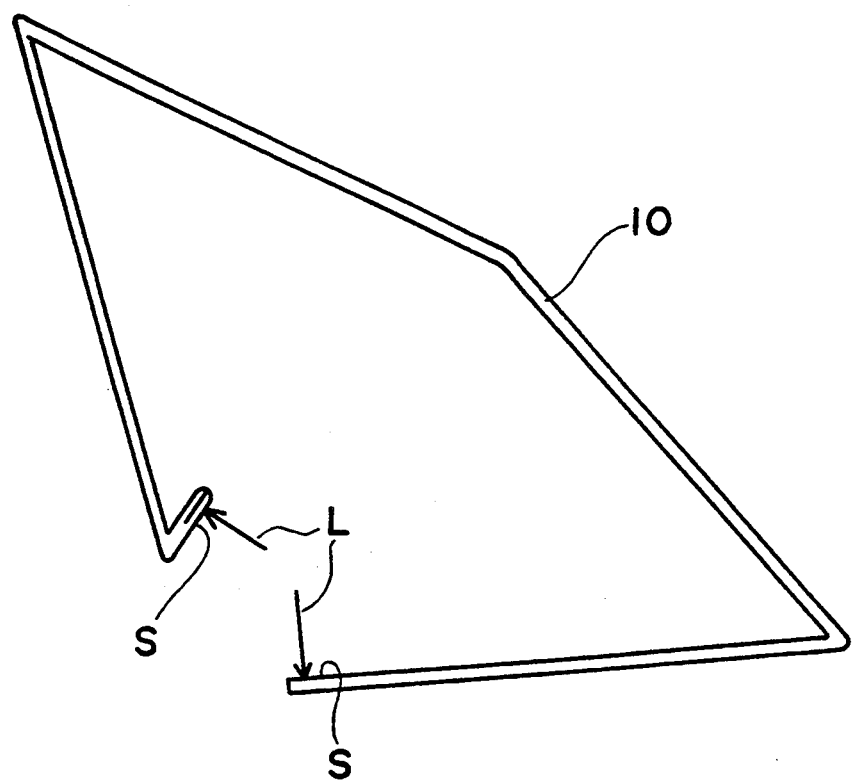
FIG. 4 is a schematic view showing a second embodiment of carrying out the method of the present invention.

Alternatively, as shown in FIG. 4, the preform sheet can be formed into a desired nearly cylindrical form, the adjacent sealing portions can be irradiated with a carbon dioxide gas laser beam, the sealing portions can be overlapped, and the overlapped portions can be pressed (FIG. 3C).

The polyester and the ethylene/vinyl alcohol copolymer used as a sealing layer are carbon dioxide gas laser-absorbent. As a result, a carbon dioxide gas laser beam is directly converted to thermal energy in the sealing layer, and melting or softening of the sealing layer is easily effected, and, therefore, the thermal damage of the paper can be minimized. In the present invention as described above, the carbon dioxide gas laser are advantageously utilized to melt or soften (to seal) the polyester or the ethylene/vinyl alcohol copolymer, and, therefore, the seal strength of the sealed portion is significantly increased compared with the flame sealing.

The sealing width suitable for obtaining appropriate seal strength after laser irradiation is, for example, preferably about 2 to 25 mm, and the use of a defocussed laser beam is suitable for the purpose.

The laser beam should be irradiated in the direction vertical to the portion to be sealed to obtain a uniform seal strength and a uniform seal width. The laser beam exhibit an intensity distribution depending upon the modes thereof, and a single mode laser beam has a higher intensity at the central portion than at the peripheral portion. In this case, it is likely to occur that the sealing temperature becomes too high at the central portion of the sealing width or an incomplete sealing is formed near the periphery of the sealing width when the sealing width is widened by defocussing. The undesirable sealing results may be effectively avoided by using a line-focussed lens, a multi-mode laser beam or both a multi-mode laser beam and a line-focussed lens.

Heating with a carbon dioxide gas laser beam is local, and the heated sealing resin layer tends to be easily cooled and solidified. It is therefore desirable that the pressing step should be effected soon after the irradiation step. For example, there may be adopted the following methods: a method wherein a predetermined portion of a preform sheet having a folded edge along one side of the sheet is irradiated with a carbon dioxide gas laser, the preform sheet is formed into a cylindrical shape so that the seal portions are overlapped, and the overlapped portions are pressed; and a method wherein a preform sheet is formed into a desired nearly cylindrical form, the adjacent sealing portions are irradiated with a carbon dioxide gas laser, the overlapping of the sealing portions is completed, and the overlapped portions are pressed. When those paper sheets having been subjected to hemming treatment or skive-hemming treatment are used, the irradiation by a carbon dioxide gas laser on the paper layer or the PE layer, through the folded polyester layer should be avoided to prevent the paper layer from being damaged. It is therefore desirable that the output power of the carbon dioxide gas laser oscillator is controlled in the range as described later.

In addition, Japanese Patent L-O-P No. 157842/1985 discloses a procedure for the preparation of the sealing tubular member for a paper container by a laser beam. Polyethylene layers as the inner layer of the paper container are melted or softened by a laser beam such as a carbon dioxide gas laser in the disclosure. However, polyethylene is not a laser beam-absorbent. Most of the incident laser beam therefore transmits the polyethylene layer, and absorbed in the paper layer. The intended heating of the polyethylene layer is performed by heat transfer from the paper surface. The heating by laser beam irradiation is therefore not only indirect but also destructive to the paper. Accordingly, efficient manufacture of a paper container having excellent properties from a preform sheet having a polyethylene layer as the innermost layer is difficult when a carbon dioxide gas laser beam is used.

It is not at all recognized in Japanese Patent L-O-P No. 157842/1985 the problems as mentioned above associated with the manufacture of the cylindrical member for a paper container excellent in gas barrier properties and flavor barrier properties and the solution of the problems.

Furthermore, it is preferable that the polyester layer edge along the side not treated by hemming or skive-hemming is sufficiently sealed to the paper or the PE layer, passing over the treated portion (the folded polyester layer). However, the untreated polyester layer edge may be firmly sealed to the paper or the PE layer mentioned above when the polyester layer is sufficiently softened or melted by carbon dioxide gas laser beam irradiation.

The irradiation conditions of a carbon dioxide gas laser are depending upon the output power, the irradiation width, the irradiation time and the absorption coefficient of the sealing layer, etc. Suitable conditions for the irradiation can be approximately set by calculation, and can also be experimentally determined. For example, the following conditions may be adopted: an oscillation output of 10 to 3000 W, preferably 15 to 2500 W; and a processing rate of 10 to 400 m/min, preferably 15 to 300 Zm/min

EFFECT OF THE INVENTION

According to the present invention, there can be prepared a cylindrical member for a paper container excellent in seal strength, gas barrier properties and flavor barrier properties. Especially, a high speed sealing of the cylindrical member becomes possible because the paper container prepared therefrom exhibits high seal strength even when prepared by irradiation for a short period. The cylindrical member prepared by the method of the present invention is suited for a container for drinks such as juice, milk and sake.

EXAMPLES

The present invention is illustrated below with reference to examples, but it should be construed that the invention is in no way limited to these examples.

Formation of cylindrical members and evaluation of the members obtained in Examples and Comparative Examples were carried out as described below:

a laser oscillator: a $CO_2$ gas laser of a single beam mode at a maximum output power of 1600 kW;

a laser irradiation system: both edges of a sample which has been subjected to skive-hemming treatment are irradiated with a laser beam (wavelength of 10.6 $\mu$m) through a beam splitter and defocussed (defocus distance of 20 to 100 mm); and the preparation of the cylindrical member and the measurement of seal strength: the sample which has been irradiated with a laser beam according to the laser irradiation system as described above is continuously and quickly pressed under a pressure of 4 kg/cm$^2$, and the resulting cylindrical member is subjected to a T-type peeling test (tensile width of 15 mm, tensile rate of 300 mm/min, measurement temperature of 23° C.) to obtain a seal strength.

The structures of laminate preform sheets used in Examples and Comparative Examples are listed in Table 1.

TABLE 1

| Sample | Structure | Thickness ($\mu$m) |
| --- | --- | --- |
| 1 | Paper/PE/Al/EMAAIBA/PES | 500/20/12/20/30 |
| 2 | Paper/PE/Al/PE | 500/20/12/30 |
| 3 | Paper/PE/Al/modified PE/EVOH | 500/20/12/20/30 |

The details of each resin listed in Table 1 are shown in Table 2.

TABLE 2

| Resin | Details |
| --- | --- |
| PES | Polyethylene terephthalate copolymer (isophthalic acid/terephthalic acid/ethylene glycol mol ratio = 10/40/50 |
| E/MAA/IBA | Ethylene/methacrylic acid/isobutyl acrylate terpolymer (E/EMA/IBA mol ratio = 93/4/3) |
| PE | High-pressure polyethylene (density = 0.923 g/cm$^3$, MFR = 3.7) |
| Modified PE | High-pressure polyethylene graft-modified with 0.5 wt % of maleic anhydride |
| EVOH | Ethylene/vinyl alcohol copolymer (ethylene/ |

TABLE 2-continued

| Resin | Details |
|---|---|
| | vinyl alcohol mol ratio = 30/70). |

Examples 1 to 13, Comparative Examples 1 to 3

Each of laminate preform sheets (Samples 1, 2, 3) was subjected to a skive-hemming treatment along one side thereof as shown in FIG. 1, and the sealing layer of the folded edge and that of the other edge was irradiated with a carbon dioxide gas laser under conditions listed in Table 3. Each of the irradiated samples was pressed under pressure to obtain a cylindrical member, and the seal strength thereof was measured. The results are shown in Table 3.

TABLE 3

| Sample | Oscillator output W | Sealing width mm | Irradiation rate M/min | Seal strength kg/15 mm |
|---|---|---|---|---|
| Ex. 1 | 1 | 20 | 2 | 10 | 1.32 |
| Ex. 2 | 1 | 30 | 2 | 10 | 1.47 |
| Ex. 3 | 1 | 50 | 5 | 10 | 1.26 |
| Ex. 4 | 1 | 100 | 5 | 10 | 1.85 |
| Ex. 5 | 3 | 30 | 5 | 10 | 1.23 |
| Ex. 6 | 3 | 50 | 5 | 10 | 1.65 |
| Ex. 7 | 1 | 700 | 4 | 100 | 1.06 |
| Ex. 8 | 1 | 900 | 4 | 100 | 0.90 |
| Ex. 9 | 1 | 1100 | 4 | 100 | 0.85 |
| Ex. 10 | 1 | 1100 | 5.5 | 100 | 0.89 |
| Ex. 11 | 1 | 1100 | 7.0 | 100 | 1.34 |
| Ex. 12 | 1 | 1100 | 8.5 | 100 | 0.96 |
| Ex. 13 | 1 | 1100 | 7.5 | 125 | 0.90 |
| Comp. Ex. 1 | 2 | 30 | 2 | 10 | 0 |
| Comp. Ex. 2 | 2 | 50 | 2 | 10 | 0 |
| Comp. Ex. 3 | 2 | 70 | 2 | 10 | 0 |

What is claimed is:

1. A method of preparing a cylindrical member for a paper container, which comprises the steps of:

providing a laminated sheet having a paper layer and an exposed layer of a thermoplastic polyester resin, said polyester resin being polyethylene terephthalate comprising terephtalic acid units and ethylene glycol units as main polymeric components and 3 to 20 mol % of copolymeric components:

forming a preform sheet by folding back an edge of said laminated sheet in a manner such that said polyester layer is exposed on both sides of the folded edge;

irradiating said polyester layer of the folded edge and the polyester layer of another edge of said preform sheet by a carbon dioxide gas laser beam in a direction respectively vertical to said folded edge and said another edge and directly converting said carbon dioxide laser beam to thermal energy in said layers and softening said layers;

forming a cylindrical member with an overlapped portion by placing said another edge over said folded edge; and pressing said overlapped portion to seal said another edge and folded edge together.

2. The method as claimed in claim 1, wherein said irradiating is conducted after formation of said preform sheet into a nearly cylindrical shape before overlapping said folded edge with said another edge.

3. The method as claimed in claim 1, wherein said carbon dioxide gas laser provides a sealing width of from 2 to 25 mm.

4. The method for preparing a cylindrical member for a paper container according to claim 1, wherein said perform sheet is prepared by skiving said paper layer at an edge of said laminated sheet and folding back the skived edge.

5. A method of preparing a cylindrical member for a paper container, which comprises the steps of:

providing a laminated sheet having a paper layer, an exposed layer of a thermoplastic polyester resin and an aluminum layer between said paper layer and said exposed polyester layer;

forming a preform sheet by folding back an edge of said laminated sheet in a manner such that said polyester layer is exposed on both sides of the folded edge;

irradiating said polyester layer of the folded edge and the polyester layer of another edge of said preform sheet by a carbon dioxide gas laser beam in a direction respectively vertical to said folded edge and said another edge and directly converting said carbon dioxide laser beam to thermal energy in said layers and softening said layers;

forming a cylindrical member with an overlapped portion by placing said another edge over said folded edge; and pressing said overlapped portion to seal said another edge and folded edge together.

6. The method as claimed in claim 5, wherein said irradiating as conducted after formation of said preformed sheet into a nearly cylindrical shape before overlapping said folded edge with said another edge.

7. The method as claimed in claim 5, wherein said carbon dioxide gas laser provides a sealing width of from 2 to 25 mm.

8. The method as claimed in claim 5, wherein said polyester resin is polyethylene terephthalate comprising terephthalic acid units and ethylene glycol units as main polymeric components and 3 to 20 mol % of copolymer components.

* * * * *